(12) United States Patent
Katz et al.

(10) Patent No.: US 6,375,789 B1
(45) Date of Patent: Apr. 23, 2002

(54) POWDER COATINGS EMPLOYING SILANES

(75) Inventors: Lawrence E. Katz, Orange; Hebert E. Petty, Bethel, both of CT (US); Shiu-Chin Huang Su, Croton-on Hudson; Bruce A. Waldman, Peekskill, both of NY (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/547,527

(22) Filed: Apr. 12, 2000

Related U.S. Application Data

(63) Continuation of application No. 09/157,658, filed on Sep. 21, 1998, now abandoned, which is a continuation-in-part of application No. 09/065,911, filed on Apr. 24, 1998, now abandoned, and a continuation-in-part of application No. 09/115,791, filed on Jul. 15, 1998, now abandoned.

(51) Int. Cl.[7] .......................... C09J 183/00; C08K 3/34; C07F 7/08; C08C 19/25; B05D 5/10

(52) U.S. Cl. .................... 156/329; 525/100; 525/328.2; 525/330.3; 525/342; 525/403; 525/418; 525/419; 525/452; 525/523; 525/101; 524/188; 524/904; 427/387; 556/420

(58) Field of Search ................. 556/420; 427/387; 524/188, 904; 525/101, 100, 328.2, 330.3, 342, 403, 418, 419, 452, 523; 156/329

(56) References Cited

U.S. PATENT DOCUMENTS

| | | | | |
|---|---|---|---|---|
| 4,151,154 A | * | 4/1979 | Berger | |
| 4,207,359 A | * | 6/1980 | Hannon et al. | 427/195 |
| 4,997,966 A | * | 3/1991 | Lohmann et al. | 556/420 |
| 5,220,047 A | * | 6/1993 | Pohl et al. | 556/420 |
| 5,726,225 A | * | 3/1998 | Braig et al. | 524/83 |
| 5,800,923 A | * | 9/1998 | Amey et al. | 428/407 |
| 5,905,150 A | * | 5/1999 | Simonian et al. | 544/221 |
| 6,268,456 B1 | * | 7/2001 | Gregorovich et al. | 528/35 |

* cited by examiner

Primary Examiner—Robert Dawson
Assistant Examiner—Jeffrey B. Robertson
(74) Attorney, Agent, or Firm—Michael P. Dilworth; Shirley S. Ma

(57) ABSTRACT

Powder coating formulations include as a component thereof a silane formula I:

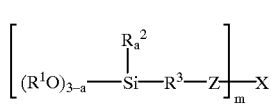

where $R^1$ is a hydrocarbon, acyl, alkylsilyl or alkoxysilyl group; $R^2$ is a monovalent hydrocarbon group; $R^3$ is alkylene, optionally interrupted with one or more ether oxygen atoms; a is 0 or 1; Z is a direct bond or a divalent organic linking group; X is an m-valent organic group or H; and m is 1–20. The silanes are useful as crosslinkers, property modifiers and/or adhesion promoters. Powder adhesives may be similarly formed with silanes of formula I.

29 Claims, No Drawings

POWDER COATINGS EMPLOYING SILANES

CROSS REFERENCE TO RELATED APPLICATIONS

This application is a continuation of application Ser. No. 09/157,658, filed Sep. 21, 1998 abandoned which is a continuation-in-part of application Ser. No. 09/065,911, filed Apr. 24, 1998 abandoned, and a continuation-in-part of application Ser. No. 09/115,791, filed Jul. 15, 1998, abandoned all incorporated herein by reference.

FIELD OF THE INVENTION

This invention pertains to powder coating and adhesive formulations utilizing organosilane compounds, or their hydrolyzates or condensates, as crosslinkers and/or adhesion promoters.

BACKGROUND OF THE INVENTION

Powder coatings are an environmentally friendly system, making them a desirable alternative to conventional solvent borne coating systems. Overall, operating and material costs are such that powder coating competes favorably with the solvent and waterborne markets.

Although powder coating represent only a portion of the total market, as compared to solvent type systems, the technology has considerable advantages. Most notably, since powder coating lacks solvent, there are no VOC issues with which to be concerned. Further, since there is less waste generated, the powder coating technique has less impact on the environment.

Powder coating involves several steps, the most critical of which is the premixing of the ingredients. During this initial phase, the binder, together with the other additives are mixed thoroughly in the equipment. Inadequate premix in the first stage could lead to a non-homogenous composition of the coating and poor mechanical properties or surface defects in the final product. The resulting premix is then fed into an extruder. The molten material produced from the extruder is cooled and squeezed into easily breakable strips. The strips are then ready for grinding to a particular particle size range.

The most common method for the application of powder coatings is by electrostatic spraying. The basic principle of this method involves propelling the powder, via compressed air, through a spray gun where it becomes electrostatically charged. In addition to charging the powder the gun also serves to deposit the powder supplied by the feeder. When the electric field is removed, the charged particles are still held on the surface, attracted by charges on the substrate. The uncharged powder in the overspray is collected and reused.

Another commonly used method of powder coating is triboelectric spraying. This is similar to electrostatic spraying, except the particles are positively charged (electrostatically charged particles have a negative charge). A new technique, that is being developed for flat surfaces, employs electromagnetic brush technology which enables efficient high speed application of very thin layers with no recycling.

Among the drawbacks of thermoset powder coating systems is the difficulty in making tough films from ingredients that are low in molecular weight and therefore able to flow easily under shear conditions. Since the application of the powder coating involves overspraying, specialized recovery equipment is also necessary to reclaim the unused powder. Substrates must also be able to withstand the powder coating cure temperatures which typically range between 150 and 190° C.

The silanes of the present invention advantageously can be used to improve the physical and chemical properties of thermoplastic powder coatings. These powder coating formulations do not require curing agents and can be applied via the aforementioned electrostatic or tribostatic spray techniques. However, most thermoplastic powder is applied by passing the heated substrate through a fluidized bed.

Silanes are known to be useful in liquid coatings. For example in WO 96/39468 sprayable liquid coating compositions are described which include a film-forming reactive silyl group-containing compound and polymer microparticles insoluble in the liquid coating composition.

SUMMARY OF THE INVENTION

One aspect of the invention is a powder coating formulation which includes as a component thereof a silane of the formula:

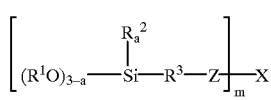

I where $R^1$ is a hydrocarbon, acyl, alkylsilyl or alkoxysilyl group; $R^2$ is a monovalent hydrocarbon group; $R^3$ is alkylene, optionally interrupted with one or more ether oxygen atoms; a is 0 or 1; Z is a direct bond or a divalent organic linking group; X is an m-valent organic group or H; and m is 1 to 20.

Silanes, useful in the present invention, can be prepared via many synthetic routes. For instance, a terminally unsaturated organic compound can be hydrosilylated to give a silane. Further chemical reactions can be carried out on silanes having organo functional groups. Silyl carbamates, useful in the invention can be prepared by reaction of polyol compounds with isocyanatopolyalkoxysilanes. Other carbamates, useful in the invention can be prepared by reaction of polyisocyanates with hydroxyalkylpolyalkoxy silanes. Such silyl carbamates can also be made by reaction of a polyisocyanate with a terminally unsaturated alcohol, and subsequent hydrosilation. Silyl isocyanates can be oligomerized to: uretdiones, allophanates, biurets, isocyanurates. Silyl amines can be reacted with anhydrides to yield amides or with isocyanates to yield ureas.

Powder coatings within the invention may be based on a conventional resin system, in such coatings the silane component of formula I function as property modifying and/or crosslinking additives. Silane compounds of formula I, where m is greater than 1, and especially those in which X is polymeric, may be used as the base crosslinking resin for the coating formulation.

DETAILED DESCRIPTION OF THE INVENTION

Powder coating systems may be based on a number of thermosetting chemistries. Well known powder coating systems include polyurethane systems based on blocked polyisocyanates and polyols, especially polyester or poly(meth) acrylate polyols; acid functional acrylic or other acid functional polymers cured with epoxy functional curing agents; anhydride/epoxy systems; epoxy/polyol systems; hybrid systems employing epoxide resins and polyesters with both carboxyl and hydroxyl functionality; systems based on hydroxyalkylamides and acid functional polymers. Examples of suitable epoxy resins include bisphenol A-type polyepoxides, glycidyl methacrylate copolymers and epoxy-novolac resins. Typically the systems are designed to melt-flow and to cure concurrently in a single heating step, although in some cases a UV curing system may be employed to separate the film-forming melt flow stage from the curing stage.

Particular powder coating systems in which the inventive compounds are useful include polyester-urethane powder coatings in which hydroxyl-functional polyester resins are cured with polyisocyanates. The polyisocyanates are blocked internally or blocked with a blocking agent. The leading blocking agent is ε-caprolactam. When the powder-coated part is heated, ε-caprolactam, is volatilized, unblocking the isocyanates groups and leaving them free to react with the hydroxyl functionality on the polyester resin. The most common blocked isocyanate is the caprolactam-blocked IPDI (isophoronediisocyanate) such as Hüls Vestagon B1530. The polyisocyanates can be blocked internally by a dimerization process to form uretidone. One such uretidone compound that is commercially available is Hüls Vestagon BF 1540 (an IPDI uretidone).

Typical hydroxyl-functional polyester resins used in polyester-polyurethane systems are derived from condensation polymerization of glycol, dicarboxylic acid and polyol (more than two hydroxyl groups in the monomer). Frequently used glycols are trimethylpentanediol and neopentyl glycol; polyols include trimethylolpropane and trimethylolethane. Dibasic acids include isophthalic acid and terephthalic acid. A standard method of preparation of hydroxyl-functional polyester resin for polyurethane powder coating with reaction details is given in the book of Oldering and Hayward [Oldering, P., and Hayward, G., in Resins for Surface Coatings, Vol. II, SITA Technology, London, 1987, p.137.]. Different patents describe methods for making hydroxyl functional polyester resin for polyurethane powder coatings with minor variations with respect to the acid value, hydroxyl value, functionality of the resin and the choice of the raw materials. The hydroxyl-functional polyester for powder coatings could have an acid number less than 10, a molecular weight of 2800–3200, a hydroxyl number of 84, and a softening point at 95–100° C.

A typical IPDI-crosslinked powder coating formulation is as follows: 52–53% hydroxyl polyester, 12–13% IPDI crosslinker, 34% pigment filler 1% flow modifier and small amount of other ingredients.

Other powder coating systems in which the inventive silane compounds are useful are acrylic-urethane powder coatings. In such systems hydroxyl-functional acrylic resins are used to prepare acrylic-urethane powders in essentially analogous way to polyester-urethanes. The hydroxyl-functional acrylic resins can be prepared as a copolymer of methyl acrylate, styrene, acrylate esters, hydroxyethyl methacrylate and acrylic acid. Typically, about 9–10% of hydroxylethylmethacrylate is needed to yield a resin with a hydroxyl value of 40, and about 2% of acrylic acid to result in acid value of 16. Methyl methacrylate and styrene copolymers yield high Tg (e.g. 95° C.–105° C.) and are usually flexibilized with longer chain acrylates or methacrylates such as butyl, ethyl, or 2-ethylhexyl. Butyl acrylate often is preferred as an acrylic comonomer because its excellent UV resistance combined with high flexibility. The molecular weight of acrylic copolymer resins are usually 5,000–20,000.

Formulations for acrylic-urethane powder coatings are similar to the polyester-urethane formulations except for the use of the acrylic resin in place of the polyester resin.

Still other powder coating formulations in which the silane compounds of the invention may be employed are based on glycidyl functional acrylic resins (especially glycidyl methacrylate copolymers) and compounds having two or more carboxylic acid groups such as dodecanedioic acid. Exemplary glycidyl methacrylate copolymers are made from 15–35 weight percent glycidyl methacrylate, 5–15 weight percent butyl methacrylate and the balance styrene and/or methyl methacrylate; have a number average molecular weight of below 2,500; have a Tg of above 80° C.; and have a melt viscosity of less than 400 poise (40 Pascal seconds) at 150° C.

The inventive silane compounds also may be employed in TGIC/polyester powder coating systems. In such systems carboxyl-functional polyester resins are cured with TGIC (triglycidyl isocyanurate). A polyester resin suitable for production of powder coatings with TGIC in the formulation is described in the patent of DSM resins BV [DSM Resins BV, Belg. Pat 898 099, 1982]. The resin is obtained by fusion esterification of neopentyl glycol, 1,4-cyclohexanedimethanol, 1,6-hexane diol, trimethylolpropane, terephthalic acid and adipic acid. Products with average molecular weight between 4,500 and 12,500 with acid values of 10–26 mg KOH/g and Tg of 40–85° C. are obtained which are suitable for making powder coatings containing 1.4–5.3% by weight of TGIC. The silanes of the present invention can also be used with similar carboxyl functional polyesters that are cured with hydroxyalkylamides.

The powder coating formulations of the invention may also be based on a thermoplastic polymer such as nylon, polyolefins (for instance polypropylene and polyethylene), polyphenylene sulfide or polyvinylchloride.

The softening points of the base components of the powder coating compositions are such that the necessary additives to produce the coating formulations of the invention can be worked in at temperatures between about 80° C. and 140° C. and yet produce a composition which can be subsequently extruded and ground to a fine free-flowing powder of about 20–120 micrometer size. Solid additives that melt and are compatible with the formulation are preferred. However, compatible liquids can be utilized via a master-batch or on an inert carrier.

A necessary component in the compositions of the present invention is a polyalkoxy or polyacyloxy silane compound, of formula I:

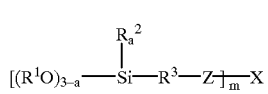

I where $R^1$ is a hydrocarbon, acyl, alkylsilyl or alkoxysilyl group; $R^2$ is a monovalent hydrocarbon group; $R^3$ is alkylene, optionally interrupted with one or more ether oxygen atoms; a is 0 or 1; Z is a direct bond or a divalent organic linking group; X is an m-valent organic group; and m is 1 to 20. The number m is preferably 2 to 6, most preferably 2.

The group $R^1$ may be an alkyl, aryl, alkaryl, aralkyl or acyl group, for instance, methyl, ethyl, n-propyl, isopropyl, butyl, t-butyl, phenyl, benzyl, tolyl, benzoyl, or acetyl. $R^1$ may also be an alkylsilyl group, for instance a trialkylsilyl group such as trimethylsilyl, triethylsilyl or tripropylsilyl or an arylalkyldialkylsilyl group such as benzyldimethylsilyl or tolyldimethylsilyl. $R^1$ may also be an alkoxysilyl group, for instance a trialkoxysilyl group such as trimethoxysilyl, triethoxysilyl and tripropoxysilyl; an alkyldialkoxysilyl such as methyldimethoxysilyl, methyldiethoxysilyl, ethyldimethoxysilyl, ethyldiethoxysilyl, methyldipropoxysilyl and ethyldipropoxysilyl; or dialkylalkoxysilyl such as dimethylmethoxysilyl, dimethylethoxysilyl, dimethylpropoxysilyl, diethylmethoxysilyl, diethylethoxysilyl, and diethylpropoxysilyl. Preferably $R^1$ is a linear, branched or cyclic $C_1$–$C_6$ alkyl group or an acetyl group. Most preferably $R^1$ is ethyl or methyl. Suitable $R^2$ hydrocarbon groups are aryl, alkenyl or alkyl groups, which may be linear, branched or cyclic, especially lower ($C_1$–$C_4$) alkyl groups such as methyl or ethyl. $R^3$ is suitably $C_2$–$C_{12}$ linear, branched or cyclic alkylene, preferably $C_2$–$C_6$ alkylene. Exemplary $R^3$ groups are propylene, ethylcyclohexylene, 3,3-dimethylbutylene, ethylene and methylene.

Z is a direct bond or a divalent organic linking group. Suitable divalent linking groups include ester, amide, urea, uretdione, carbamate, carbonate, aromatic ring, heterocyclic ring, allophanate, biuret, amine, ether and thioether. The Z groups may be the same or different.

The m-valent organic group X is typically a residue of an organic compound having one or more carboxylic acid, halide, alcohol, isocyanate, amine, epoxy, thiol, or other pendant or terminal functional groups which have been reacted in a known manner to form the linkages Z. The residue X may be polymeric, for instance polyacrylate, polycarbonate, polyurethane, polyalkylene, polyester, polyamide, polyether, and combinations of these. Preferably the group X is an aliphatic, cycloaliphatic or aromatic hydrocarbon group, preferably a $C_4$–$C_{24}$ hydrocarbon group, especially a saturated linear, branched or cyclic aliphatic hydrocarbon group. Exemplary X groups include 2,3-butylene; 1,6-hexylene; 1,4-cyclohexanedimethylene; 1,4-cyclohexylene; 1,7-heptylene; 1,8-octylene; 1,12-dodecylene; 1,10-decylene; 1,9-nonylene; 4,4'-isopropylidenediphenylene; 4,4'-isopropylidenedicyclohexylene; 1,4-butylene; phenylene; methylphenylene, 1,3-(α,α,α',α'-tetramethyl)xylylene.

Preferred silanes useful in the inventive formulations may be characterized by formula II:

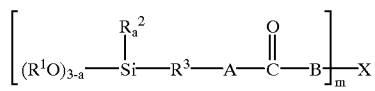

where $R^1$, $R^2$, $R^3$, a, m and X are as previously defined, and A and B are independently —NH— or —O—.

Silyl carbamates of formula II, where A=NH and B=O, may be prepared by reaction of polyol compounds with isocyanatoalkylalkoxysilanes. Novel silane carbamates which may be obtained in this manner include carbamates so formed in which the polyol compound is a hydrocarbon diol. Linearly symmetrical diols such as 1,4-cyclohexanediol, 4,4'-isopropylidenedicyclohexanol and 1,4-cyclohexanedimethanol also produce preferred silane carbamate compounds of the invention. Silyl carbamates of this type can also be made by the reaction of a silyl isocyanate with a polymeric polyol, such as a polyether polyol, a polyester polyol, a polybutadiene polyol or a polyacrylate polyol.

Examples of suitable isocyanatoalkylalkoxysilanes are isocyanatopropyltrimethoxysilane, isocyanatopropylmethyldimethoxysilane, isocyanatopropylmethyldiethoxysilane, isocyanatopropyltriethoxysilane, isocyanatopropyltriisopropoxysilane, isocyanatopropylmethydiisopropoxysilane; isocyanatoneohexyltrimethoxysilane, isocyanatoneohexyldimethoxysilane, isocyanatoneohexydiethoxysilane, isocyanatoneohexyltriethoxysilane, isocyanatoneohexytriisopropoxysilane, isocyanatoneohexyldiisopropoxysilane, isocyanatoisoamyltrimethoxysilane, isocyanatoisoamyldimethoxysilane, isocyanatoisoamylmethyldiethoxysilane, isocyanatoisoamyltriethoxysilane, isocyanatoisoamyltriisopropoxysilane, and isocyanatoisoamylmethyldiisopropoxysilane.

Examples of suitable polyol compounds which will produce solid silyl carbamates with isocyanatoalkylalkoxysilanes include 2,3-butanediol; 1,6-hexanediol; 1,4-cyclohexanedimethanol; 1,4-cyclohexanediol; 1,7-heptanediol; 1,8-octanediol; pentaerythritol; 1,12-dodecanediol; 1,10-decanediol; 3,6-dimethyl-4-octyne-3,6-diol; 1,9-nonanediol; bisphenol A; hydrogenated bisphenol A (i.e., 4,4'-isopropylidenedicyclohexanol); and 1,4-butanediol.

The reaction product of polyol and isocyanatopropyltrialkoxysilane can be a liquid of various viscosities or a solid at room temperature.

The isocyanatopropylalkoxysilane preferably has a high purity, i.e. above about 95%, and is preferably free from impurities and/or additives, such as transesterification catalysts, which can promote side reactions. Examples of undesirable transesterification catalysts are acids, bases and organometallic compounds. For isocyanatopropyltrimethoxysilane a purity of at least 98% is preferred. This may be accomplished by distilling commercially available isocyanatopropyltrimethoxysilane, available as SILQUEST® Y-5187 silane from Witco Corporation, to remove impurities such as (3-trimethoxysilylpropyl) methylcarbamate and others as well as inhibitors, catalysts and other additives.

The preferred glycols are the symmetrical ones such as 1,4-butanediol, 1,4-cyclohexanediol, and 1,4-cyclohexanedimethanol. While the reaction product of 1,4-butanediol and isocyanatopropyltriethoxysilane is a solid at room temperature, the reaction product of either 1,2-butanediol or 1,3-butanediol with isocyanatopropyltriethoxysilane is a liquid at room temperature. Similarly, the reaction product of 1,4-cyclohexanediol and isocyanatopropyltriethoxysilane is a solid at room temperature but the reaction product of 1,2-cyclohexanediol and isocyanatopropyltriethoxysilane is a liquid at room temperature.

An illustrative reaction to produce silane carbamate compounds from a diol is depicted below:

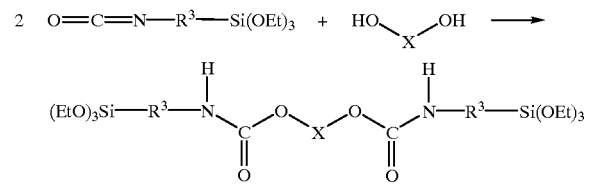

where $R^3$ and X are as previously defined. The reaction is catalyzed by a tin catalyst such as dibutyltin dilaurate (DBTDL); dibutyltin oxide; dibutyltin dichloride; dibutyltin diacetate; dibutyltin dimaleate; dibutyltin dioctoate; dibutyltin bis(2-ethylhexanoate); tin acetate; tin octoate; tin ethylhexanoate; tin laurate. Other urethane catalysts include: K-KAT®s (zirconium, aluminum, or bismuth compounds); diazabicyclo[2,2,2]octane (DABCO); N,N-dimethylcyclohexylamine (DMCA); 1,8-diazabicyclo[5,4,0]-undec-7-ene (DBU); 1,5-diazabicyclo[2,3,0]non-5-ene (DBN). The reactions are typically exothermic and the temperature should be controlled to minimize the color in the final product. Excessive exotherm may also introduce impurities by way of side reaction. It is recommended that the exotherm be controlled so as not to allow the temperature of the reaction mixture to exceed 150° C., more preferably no more than about 110° C.

In a similar way triols, tetrols, pentols and hexols may be reacted with equivalent amounts of isocyanatoalkyltriethoxysilane. Such materials include gylcerine, trimethylolpropane, trimethylolethane, pentaerythritol, inositol, mannitol, sorbitol, fructose, fucose and glucose.

A preferred silane of the invention is the adduct compound prepared from two moles of isocyanatopropyltriethoxysilane and one mole of 1,4-cyclohexanedimethanol.

Examples of these carbamates include bis[3-(triethoxysilyl)propyl]-1,4-cyclohexanedimethyldicarbamate, bis[3-(trimethoxysilyl)propyl]-1,4-cyclohexanedimethyldicarbamate; bis[3-(methyldimethoxysilyl)propyl]-1,4-cyclohexanedimethyldicarbamate; bis[3-triethoxysilyl)propyl]-1,2-cyclohexanedimethyldicarbamate; bis[3-methyldiethoxysilyl)propyl]-1,2-cyclohexanedimethyldicarbamate; bis[3-triethoxysilyl)propyl]-1,4-butanedicarbamate, bis[3-(methyldiethoxysilyl)propyl]-1,4-butanedicarbamate; bis[3-triethoxysilyl)propyl]-2,3-butanedicarbamate; bis[3-(triethoxysilyl)propyl]-1,10-decanedicarbamate; bis[3-(trimethoxysilyl)propyl]-1,10-decanedicarbamate, bis[3-trimethoxysilyl)propyl]-1,6-hexanedicarbamate, tris[3-trimethoxysilyl)propyl]-1,2,3-propanetricarbamate, tris[3-triethoxysilyl)propyl]-1,2,3-propanetricarbamate, tris[3-(methyldimethoxysilyl)propyl]-1,2,3-propanetricarbamate.

Other silyl carbamates of formula II, where A=O and B=NH, may be prepared by reaction of an alkoxysilylalcohol with a polyisocyanate. Such silyl carbamates may also be made by reaction of a polyisocyanate with a terminally unsaturated alcohol, and subsequent hydrosilation.

An illustrative reaction to produce a silyl carbamate from a diisocyanate and an alkoxysilylalcohol is depicted below:

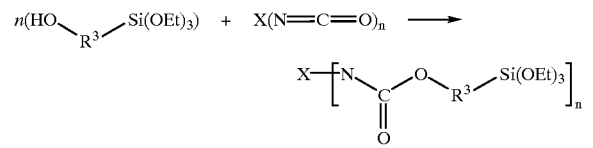

where $R^3$ and X are as previonsly defined. This reaction may be catalyzed by the aforementioned catalysts and the same recommendations apply. Preferred compounds $X(N=C=O)_n$ are polyisocyanate prepolymers derived from diisocyanates and polyols. In a similar way triisocyanates, such as IPDI isocyanurate and HDI isocyanurate, may be reacted with equivalent amounts of alkoxsilyl alcohol. An alkoxysilyl polyol may be reacted with an equivalent amount of polyisocyanate in this reaction.

Examples of suitable alkoxysilyl alcohols include N(3-methyldiethoxysilylpropyl)-2-hydroxy-1-propyl carbamate;. N(3-methyldiethoxysilylpropyl)-1-hydroxy-1-propyl carbamate; N(3-triethoxysilylpropyl)-2-hydroxy-1-propyl carbamate; N(3-triethoxysilylpropyl)-1-hydroxy-1-propyl carbamate; N-(3-triethoxysilylpropyl)-4-hydroxybutyramide. Other examples are described in U.S. Pat. No. 5,587,502, the teachings of which are incorporated herein by reference. Suitable polyisocanates include, but are not limited to: 1,6-hexane diisocyanate (HDI); isophorone diisocyanate (IPDI); 2,4-toluene diisocyanate; 2,6-toluene diisocyanate; mixtures of 2,4-toluene diisocyanate and 2,6-toluene diisocyanate (TDI); diphenylmethane 4,4-diisocyanate (MDI); bis(4-isocyanatocyclohexyl)methane ($H_{12}$MDI); 1,3-($\alpha,\alpha,\alpha',\alpha'$-tetramethyl)xylene diisocyanate (TXMDI); $\alpha,\alpha$-dimethylmetaisopropylbenzyl isocyanate (m-TMI); and the dimers, trimers, biurets, allophanates, and other oligomers of such polyisocyanates. The polyisocyanate may also be a polymeric polyurethane "prepolymer", such as those derived from the reaction of the forementioned polyisocyanates and a polyether polyol, a polyester polyol, a polybutadiene polyol or a polyacrylate polyol.

Alternatively carbamates useful in the present invention may be prepared by reaction of a terminally unsaturated alcohol with a polyisocyanate, and hydrosilation of the terminally unsaturated polyurethane intermediate in the presence of a suitable catalyst. An example of this reaction sequence, using allyl alcohol and a platinum catalyst, is depicted below:

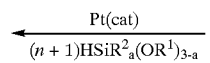

where $R^1$ and $R^2$ are as previously defied, X is an organic residue group and n is 1 to 10. For example the isocyanate $OCN-X-(NCO)_n$ can be HDI, IPDI, $H_{12}$MDI, TDI, MDI, TMXDI, TMI, or a dimer, trimer, allophanate or oligomeric prepolymer thereof. A terminally unsaturated polymeric alcohol can also be used in above sequence in place of allyl alcohol. Similarly, a terminally unsaturated isocyanate can be reacted with a polyol to give a terminally unsaturated carbamate, which can be hydrosilated in lie manner:

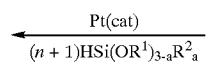

Silane urea compounds may also be employed in the formulations of the invention. Such compounds correspond to formula II where both A and B are NH. They are suitably prepared by reaction of an alkoxysilylalkylamine with an organic isocyanate or by reaction of an organic amine with an alkoxysilylalkylisocyanate. The reaction is analogous to the reaction of isocyanate and alcohol but typically does not require a catalyst.

Examples of alkoxysilylalkylamines include 3-aminopropyltriethoxysilane (SILQUEST® A-1100); 3-aminopropyltrimethoxysilane (SILQUEST® A-1110); 3-phenylaminopropyltrimethoxysilane (SILQUEST® Y-9669); N,N-bis(3-propyltrimethoxysilyl)amine (SILQUEST® A-1170); 3-aminopropyl (methyldiethoxysilane); 3-aminopropyl (methyldimethoxysilane); aminoneohexyltriethoxysilane (SILQUEST® Y-11637).

Examples of organic (poly)amines include: n-octylamine, n-hexylamine, ethylenediamine; propylenediamine; 1,4-diaminobutane; 1,6-diaminohexane; IPDA; TDA; MDA; $H_{12}$MDA. The organic amine may be polymeric, such as the JEFFAMINES® (polyether polyamines).

In all of the foregoing descriptions of synthetic methods it will be understood that if trialkoxysilane starting compounds are replaced by corresponding dialkoxyalkylsilanes, triacyloxysilanes or diacyloxyalkylsilanes, other compounds of formula I will be produced.

Other conventional additives additionally may be employed.

Examples of conventional powder coating additives which may be incorporated into the coating formations of the invention include accelerating catalysts, pigments, leveling agents, flow modifiers, light stabilizers, antioxidants, and fillers, all well known in the art. These ingredients may be employed in the inventive compositions in conventional amounts. The catalysts, typically titanate or tin compounds, are conventionally added in amounts of 0.05%–1.5% by weight, preferably 0.1%–0.5% by weight. The fillers and colorants may be added in large amounts, often as much as 50% or more, and sometimes 60% or more of the total composition weight. Clearcoat formulations may be entirely free of fillers and pigments.

The silane compounds as described above are useful as crosslinkers, as adhesion promoters, and/or as modifiers of such film properties as environmental resistance or mar resistance. At the elevated temperatures used to cure the powder coating, the carbamate groups of the molecules, if present, can react with isocyanate groups to form allophanates and biurets and/or the $SiOR^1$ groups can react with polyols in the coating in exchange reactions.

Silanes of formula I may be employed alone or in combination with conventional crosslinking agents. They may be used to furnish the principal crosslinking network, or they may reinforce conventional crosslinking networks. In compounds where the group X is polymeric and the compound is a meltable solid, the silane of formula I may be employed as the base resin of the coating system.

In addition to the methods described above, polymeric silanes of the present invention can be synthesized by copolymerizing a silane monomer with a non-silane monomer. For example 3-methacryloxypropyltrimethoxysilane, SILQUEST®A-174, can be added to an alkyl(meth)acrylate monomer such as methyl methacrylate (and/or substituted (meth)acrylates; such as hydroxyethyl acrylate, hydroxyethyl methacrylate, glycidyl acrylate or glycidyl methacrylate) and copolymerized to give a siloxy functional poly(meth)acrylate (or if glycidyl methacrylate was included, a siloxy functionalized GMA resin).

Preferred silane compounds used in the formulations of the invention are meltable solids which make them especially suited for incorporation into conventional powder coating formulations without substantially altering the melt properties of the material. Melting points desirably will fall within the range of from about 30° C. to about 170° C., preferably from about 40° C. to about 120° C. and more preferably from about 50° C. to about 110° C.

The molecular weight of the silane compounds of the invention is preferably about 8000 Daltons or less, more preferably about 5000 Daltons or less.

Although solids are a preferred embodiment of the present invention, silanes in the form of liquids or waxes can be used as additives in conventional powder coating resin systems.

A preferred mode of adding silanes that are not solids is via an inert carrier, such as silica, carbon black or porous polymers. Liquids may also be added in the form of solid solutions, as a "master-batch," or encapsulated. Silanes of the present invention may be added to a powder coating formulation via incorporation in/on pigments or fillers. Titanium dioxide is a preferred carrier for these silanes. Silanes in these forms may be added to the powder coating formulation in the same manner as solid silanes.

In a typical powder coating formulation, a useful quantity of the silane additive will be in the range of from about 0.5 to about 30% by weight of the formulation, more preferably from about 2% to about 10% by weight. In some formulations, however, higher or lower amounts may prove beneficial. Further, as noted above, silane compounds of formula I in which X is polymeric may be used as the base resin. Therefore the inventive powder coating formulations should not be considered to be restricted to these quantity ranges.

Powder adhesives may be similarly formulated. Such adhesives may be applied to one or both of the substrates to be joined in the same manner as a powder coating, for instance by electrostatic spraying, triboelectric spraying, electromagnetic brushing or via fluidized bed. The substrates are joined with heating to fuse the coating, and, if curable, allowed to cure. Upon cooling a bonded assembly is formed. Typically the size distribution of such powder adhesives is such that at least 50% by weight will pass through a 200 mesh screen.

The invention is further illustrated by the following non-limiting examples.

EXAMPLE 1

Silane carbamate compounds were prepared by reaction of isocyanatopropyltriethoxysilane with the polyols listed in Table I. Reactions were run at an approximately 30 g total scale using a 2:1.05 mole ratio of isocyanatopropyltriethoxysilane:polyol with a charge of 300–500 ppm dibutyltin dilaurate (DBTDL) catalyst. A 100 ml round bottomed 3-necked flask was equipped with a magnetic stir bar; on the one side was arranged a thermometer. A heating mantle with a thermowatch was included in the set-up. A TEFLON® lubricant was used on the joints. The components were transferred into the flask, including the catalyst charge of 300–500 ppm DBTDL. Under $N_2$, the flask was slowly heated until exotherm occurred. The maximum temperature was held to approximately 100° C. to reduce final product coloration. The reaction was monitored for completion using the IR based on the disappearance of isocyanate. The appearance and viscosity of the product was recorded. If the product was a solid, a melting point was also determined by DSC (peak temperature). Product form and melting points of the solid products are given in Table I.

TABLE I

| Polyols Screened | Polyol Structure | Product Form | Product M.P. (° C.) |
|---|---|---|---|
| 1,2-Octanediol | $CH_2(CH_2)_5CH(OH)CH_2OH$ | liquid | |
| 1,4-Cyclohexanediol | $C_6H_{10}(OH)_2$ | white hard chunks | 63.1 |
| 1,12-Dodecanediol | $OH(CH_2)_{12}OH$ | yellow waxy solid | 56.1 |
| 1,10-Decanediol | $CH_3(CH_2)_7CH(OH)CH_2OH$ | white waxy solid | 48.0 |
| 1,2-Butanediol | $CH_3CH_2CH(OH)CH_2OH$ | pale yellow liquid | |
| 1,3-Propanediol | $HO(CH_2)_3OH$ | pale yellow liquid | |
| 1,5-Pentanediol | $HO(CH_2)_5OH$ | pale yellow liquid | |

TABLE I-continued

| Polyols Screened | Polyol Structure | Product Form | Product M.P. (° C.) |
|---|---|---|---|
| 1,3-Butanediol | $CH_3CH(OH)CH_2CH_2OH$ | yellow liquid | |
| 1,6-Hexanediol | $HO(CH_2)_6OH$ | white waxy solid | 63.3 |
| 1,7-Heptanediol | $HO(CH_2)_7OH$ | solid | 51.1 |
| 1,8-Octanediol | $HO(CH_2)_8OH$ | solid | 58.9 |
| 1,9-Nonanediol | $HO(CH_2)_9OH$ | white waxy solid | 38.8 |
| 2,2-Dimethyl-1,3-Propanediol | $HOCH_2C(CH_3)_2CH_2CH_2OH$ | pale yellow liquid | |
| 2,3-Butanediol | $CH_3CH(OH)CH(OH)CH_3$ | pale yellow waxy solid | 75 |
| 2-Ethyl-2-(hydroxymethyl)-1,3-propanediol | $C_2H_5C(CH_2OH)_3$ | pale yellow liquid | |
| 3,6-Dimethyl-4-Octyne-3,6-diol | $C_2H_5C(CH_3)(OH)C{\equiv}C(CH_3)(OH)C_2H_5$ | white waxy solid | 73.6 |
| 3-cyclohexene-1,1-dimethanol | $C_6H_9CH_2OH$ | dark yellow liquid | |
| Bisphenol A | $(CH_3)_2C(C_6H_4OH)_2$ | pale yellow waxy solid | not determined |
| Hydrogenated Bisphenol A | $(CH_3)_2C(C_6H_{10}OH)_2$ | yellow moist solid | not determined |
| cis-1,2-Cyclohexanediol | $C_6H_{10}(OH)_2$ | yellow liquid | |
| Esterdiol 204 | $HOCH_2C(CH_3)_2CO_2CH_2C(CH_3)_2CH_2OH$ | yellow liquid | |
| Neopentyl Glycol | $HOCH_2C(CH_3)_2CH_2OH$ | pale yellow liquid | |
| Dipropylene Glycol | $HOC_3H_6OC_3H_6OH$ | pale yellow liquid | |
| Ethylene Glycol | $HOCH_2CH_2OH$ | yellow liquid | |
| 1,4-Butanediol | $HO(CH_2)_4OH$ | white waxy solid | 55.4 |
| Pentaerythritol | $C(CH_2OH)_4$ | white waxy solid | 86.1 |
| Polypropylene Glycol 1000 | $H(OCH(CH_3)CH_2)_nOH$ | dark yellow liquid | |
| trans-1,2-Cyclohexanediol | $C_6H_{10}(OH)_2$ | yellow liquid | |
| 2,3-butanediol (meso form) | $CH_3CH(OH)CH(OH)CH_3$ | white waxy solid | 89.8 |
| 2,2,4-Trimethyl-1,3-pentanediol | $(CH_3)_2CHCH(OH)C(CH_3)_2CH_2OH$ | yellow liquid | |

EXAMPLE 2

Preparation of bis[3-(triethoxysilyl)propyl]-1,4-cyclohexanedimethyldicarbamate

To a two-liter, three-necked flask, equipped with a magnetic stirrer, thermometer, reflux condenser, additional funnel under nitrogen blanket, was added 199.4 grams of melted cyclohexanedimethanol (from Aldrich), 685.6 g of SILQUEST® A-1310 (3-isocyanatopropyltriethoxysilane, from Witco Corp. and 0.44 g of DBTDL. With good mixing and a small heat input, the flask content exothermed to 146° C. The temperature of reaction mixture was maintained at 90–110° C. for 3 hours. Infrared spectra of the reaction mixture was taken at intervals to follow the progress of the reaction. The reaction was considered complete when there was essentially no isocyanate absorption at 2272 $cm^{-1}$. Upon cooling a white solid was obtained. Melting of this material was determined by DSC (differential scanning calorimetry) to be 82.6° C. $^{13}C$ and $^{29}Si$ NMR analyses of the product confirmed the formation of bis[3-(triethoxysilyl)propyl]-1,4-cyclohexanedimethyldicarbamate.

EXAMPLE 3

Preparation of Solid Form bis[3-(trimethoxysilyl)propyl]-1,4-cyclohexanedimethyldicarbamate Commercially available SILQUEST® Y-5187 (3-isocyanatopropyltrimethoxysilane, from Witco Corp) was distilled to give 98.5% purity by GC. Melted cyclohexanedimethanol (21.9 g) and DBTDL (10 ml, 0.0101 g) was charged to a 100-ml three-necked flask equipped with a magnetic stirrer, thermometer, reflux condenser, additional funnel under nitrogen blanket. The contents were heated to 50° C. Distilled Y-5187 (3-isocyanatopropyltrimethoxysilane) was added dropwise with good mixing. An exotherm occurred as soon as the addition started and the temperature of the reaction mixture rose to 100° C. The heating source was removed and the addition of Y-5187 continued at such a rate to keep the internal temperature below 100° C. After the addition was complete, the reaction mixture was held at 85° C. for an hour. No isocyanate was present by infra-red analysis. After cooling to room temperature, the product was a waxy solid.

EXAMPLE 4

Preparation of Liquid Form bis[3-(trimethoxysilyl)propyl]-1,4-cyclohexanedimethyldicarbamate To a two-liter, three-necked flask, equipped with a mechanical stirrer, thermometer, reflux condenser, additional funnel under nitrogen blanket, was added 350.6 grams of melted cyclohexanedimethanol (from Aldrich), and 1.3 g of DBTDL. With good mixing, SILQUEST® Y-5187 silane (953.7 g of 95.3% purity) was added dropwise at such a rate to keep the internal temperature maintained at 70–90° C. The addition took 3.5 hours to complete. After the addition was complete, the reaction mixture was held at 85° C. for an hour and the mixture was stirred at ambient temperature for 17 hours. The completion of the reaction was confirmed by infra-red spectroscopy. The reaction product was a viscous liquid and had a Gardner Holt viscosity of X+½ (15.3 stokes).

EXAMPLE 5

Preparation of bis[3-(triethoxysilyl)propyl]-1,2-cyclohexanedimethyldicarbamate

To a 100-ml, three-necked flask, equipped with a magnetic stirrer, thermometer, reflux condenser, additional funnel under nitrogen blanket, was added 2.13 g cis-1,2-cyclohexanedimethanol (from Acros), 7.50 g of SILQUEST® A-1310 (3-isocyanatopropyltriethoxysilane, from Witco Corp.) and 0.0119 g of DBTDL (dibutyl tin dilaurate). The reaction mixture was heated at 100° C. for 2 hours. The completion of the reaction was monitored and confirmed by infra red spectroscopy. The reaction product was a viscous liquid.

EXAMPLE 6

Two carboxyl functional polyester resin samples, DSM products P-5500 and P-3900 were obtained. The effect of a solid silane on glass transition temperatures (Tg) of the polyester resins was examined using DSC. The solid silane was the adduct of isocyanatopropyltriethoxysilane and 1,4-cyclohexanedimethanol from Example 2.

In two runs, the Tg of P-5500 was measured as 57.5° C. and 58.2° C., respectively. After adding 5 wt % of the silane, the Tg of the blend was measured as 59.4° C.

The Tg of P-3900 was measured as 59.2° C. After adding 5 wt % of the silane, the Tg of the blend was measured as 58.7° C.

These results illustrate that the Tg of typical resins used in powder applications are not substantially adversely affected by addition of the silane component of the invention.

EXAMPLE 7

Powder coating formulations 3A and 3B were prepared from the ingredients listed in Table II, where the numerical values are parts by weight. The ingredients were dry mixed with a Prism Pilot 3 high speed mixer. The mixture was then extruded at approximately 100° C. on a Werner and Pfleiderer ZSK-30 extruder. The cooled extrudate was ground to a powder in a Retsch/Brinkman ZM-100 grinder. The powder was sieved through a 200 mesh sieve.

TABLE II

| Components | 3A Comparative | 3B Invention |
|---|---|---|
| Glycidyl methacrylate resin (PD 3402, Anderson Development) | 72.18 | 67.85 |
| Dodecanedioic acid | 22.34 | 21.0 |
| Example 2 Silane | 0 | 6.00 |
| Flow Modifier (Modaflow III, Solutia) | 2.18 | 2.05 |
| Tinuvin 900 (Ciba-Geigy) | 1.42 | 1.34 |
| Tinuvin 144 (Ciba-Geigy) | 0.94 | 0.88 |
| Benzoin | 0.94 | 0.88 |

A third formulation, 3C, was prepared by adding to a portion of formulation 3B a sufficient amount of a solvent solution of dibutyltin dilaurate catalyst to attain a catalyst level of 0.053% by weight. The solvent was evaporated.

The three powder coating formulations were electrostatically sprayed (using a Nordson Versa-Spray II gun) onto 3 inch×6 inch×0.032 inch (76 mm×152 mm×0.8 mm) steel Q panels. The coated plates were baked at 180° C. for 18 minutes. Physical property measurements made on the coated panels were:

TABLE III

| Sample | Pencil Hardness[1] | Pendulum (Koenig)[2] sec | Initial Gloss 60° gloss[3] | Initial Gloss 20° gloss[3] | 20° Gloss Retention[4] % | MEK double rubs[5] |
|---|---|---|---|---|---|---|
| 3A | 5H | 176 | 95.1 | 65.3 | 70.6 | 100 |
| 3B | 5H | 169 | 94.8 | 65.0 | 77.5 | 600 |
| 3C | 5H | 162 | 93.6 | 62.4 | 84.3 | 800 |

[1]ASTM D-3363-74
[2]ASTM D-4366-84
[3]ASTM D-523
[4]The cured coating is subjected to abrasion by an AATCC Crockmeter. The panel is coated with a thin, dry layer of BON AMI ® brand cleanser. The finger of the Crockmeter is covered with a felt cloth. Ten double rubs by the Crockmeter finger are applied. The % 20° gloss retention of the damaged area versus the undamaged area is recorded.
[5]ASTM D-4752-87

The results demonstrate improved mar resistance and solvent resistance of the formulations containing the silane of the invention without degradation of the other properties tested.

When coated plates were prepared as above but cured for only 15 minutes at 180° C., formulations 3B, 3C, and a 1:1 by weight mixture of 3A and 3B, all gave pencil hardness results of 5H, whereas formulation 3A, which did not contain any of the inventive silane compound, gave a pencil hardness result of 3H.

EXAMPLE 8

Powder coating formulations 4A and 4B were prepared from the ingredients listed in Table IV, where the numerical values are parts by weight. Commercially available SILQUEST® Y-11570 (1,3,6-tris[propyltrimethoxysilyl] isocyanurate), from Witco Corp.) was employed. The ingredients were dry mixed with a Prism Pilot 3 high speed mixer. The mixture was then extruded at approximately 100° C. on a Werner and Pfleiderer ZSK-30 extruder. The cooled extrudate was ground to a powder in a Retsch/Brinkman ZM-100 grinder. The powder was sieved through a 140 mesh sieve and sprayed on steel substrates as before.

TABLE IV

| Components | 4A Comparative | 4B Invention |
|---|---|---|
| Glycidyl methacrylate resin (PD 3402, Anderson Development) | 72.18 | 70.00 |
| Dodecanedioic acid | 22.34 | 21.67 |
| Silane Isocyanurate (Y-11570) | 0 | 3.00 |
| Flow Modifier (Modaflow III, Solutia) | 2.18 | 2.12 |
| Tinuvin 900 (Ciba-Geigy) | 1.42 | 1.38 |
| Tinuvin 144 (Ciba-Geigy) | 0.94 | 0.87 |
| Benzoin | 0.94 | 0.87 |

Physical property measurements made on the coated panels were:

TABLE V

| Sample | Pencil Hardness | Pendulum (Koenig) sec | Initial Gloss 60° gloss | Initial Gloss 20° gloss | 20° Gloss Rentention % | MEK double rubs |
|---|---|---|---|---|---|---|
| 4A | 5H | 192 | 99.2 | 79.7 | 70.6 | 100 |
| 4B | 5H | 200 | 99.5 | 80.6 | 91.2 | 280 |

EXAMPLE 9

Powder coating formulations 5A and 5B were prepared from the ingredients listed in Table VI, where the numerical values are parts by weight. The ingredients were dry mixed on a roller mill. The mixture then was melt mixed at approximately 110° C. on a Braebender mixer. The cooled extrudate was ground to a powder in a Retsch/Brinkman ZM-100 grinder. The powder was sieved through a 140 mesh sieve.

TABLE VI

| Components | 5A Comparative | 5B Invention |
|---|---|---|
| Polyester resin (Crylcoat 450; UCB) | 121.2 | 119.6 |
| Titanium Dioxide (R-960; DuPont) | 66.6 | 65.8 |
| TGIC (Araldite PT810P; Ciba) | 9.2 | 9.1 |
| Example 2 Silane | 0 | 2.5 |
| Flow Modifier (Modaflow III, Solutia) | 2.2 | 2.2 |
| Benzoin | 0.8 | 0.8 |
| Dibutyltin dilaurate | 0 | 0.05 |

The powder coating formulations were sprayed electrostatically (using a Nordson Versa-Spray II gun) onto 3 inch×5 inch×0.032 inch (76 mm×152 mm×0.8 mm) steel Q panels. The coated plates were baked at 180° C. for 15 minutes.

The mar characteristics of these coatings were evaluated using an AATCC Crockmeter test as in the previous example. The results indicated that the silane of Example 2 retained 66.7% of its gloss versus 50.5% for the comparative formulation. This is illustrative of the improvement in mar resistance imparted by the silanes of this invention.

EXAMPLE 10

Silane urea compounds useful as powder coating additives were prepared by reaction of the isocyanate and amine compounds Table VII. Reactions were run at an approximately 30 g total scale using a 1:1.03 equivalent ratio of isocyanate:amine. No catalyst was used in the reactions. Otherwise, reaction conditions were as in Example 1.

TABLE VII

| Isocyanate | Amine | Product Form | Melting Pt. (° C.) |
|---|---|---|---|
| isocyanatopropyl trimethoxysilane | hexamethylene diamine | chunky white solid | 136 |
| " | ethylene diamine | white waxy solid | 121 |
| " | 1,2-diaminocyclohexane | brown paste | 114 |
| " | trans-1,2-diaminocyclohexane | white hard solid | 198 |
| " | 1,3-diaminopropane | white chunky solid | 116 |
| " | 1,3-cyclohexane-bis-methylamine | yellow hard solid | 79 |
| " | 1,4-diaminobutane | yellow-brown chunks | |
| bis-(isocyanatophenyl) methane (MDI) | 3-aminopropyltriethoxysilane | hard white solid | 67 |
| bis-(4-isocyanatocyclohexyl) methane (Desmodur W) | " | hard white solid | 127 |
| 1,6-diisocyanatohexane | " | yellow hard solid | 117 |
| isophorone diisocyanate | " | yellow hard solid | 105 |
| 1,3-bis(isocyanatomethyl) cyclohexane | " | yellow hard solid | 70 |
| bis-(4-isocyanatocyclohexyl) methane (Desmodur W) | 3-aminopropylmethyl diethoxysilane | hard white solid | 77 |

The above examples and disclosure are intended to be illustrative and not exhaustive. These examples and description will suggest many variations and alternatives to one of ordinary skill in this art. All these alternatives and variations are intended to be included within the scope of the attached claims. For instance, while the preparation of the inventive silane containing powder coating formulations has been primarily exemplified with respect to silanes prepared by the reaction of active hydrogen compounds with isocyantates, it will be understood that other silane compounds within the definition of formula I above may readily be prepared and employed in the inventive formulations. Those familiar with the art may recognize other equivalents to the specific embodiments described herein which equivalents are also intended to be encompassed by the claims attached hereto.

What is claimed is:

1. A curable powder coating formulation which includes as a component thereof a silane of formula I:

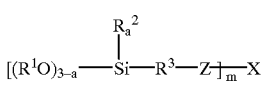

where $R^1$ is a hydrocarbon, acyl, alkylsilyl or alkoxysilyl group; $R^2$ is a monovalent hydrocarbon group; $R^3$ is alkylene; a is 0 or 1; Z is a direct bond or a divalent organic linking group having from 2 to 5 carbon atoms; X is an m-valent organic group or H with the proviso that if Z is a carbamate then X is a 1° or 2° organic group; and m is 1 to 20.

2. A powder coating formulation as in claim 1 wherein each Z is a direct bond or a member selected from the group consisting of ester, amide, urea, uretdione, carbamate, carbonate, aromatic ring, heterocyclic ring, allophanate, biuret, amine, ether, and thioether groups.

3. A powder coating formulation as in claim 2 wherein X is an m-valent residue of an organic compound having at least one functional group selected from the group consisting of carboxylic acid, halide, alcohol, isocyanate, amine, epoxy, and thiol thereon, said functional group having been reacted to form linkage Z.

4. A powder coating formulation as in claim 1 wherein $R^1$ is alkyl, aryl, alkaryl, aralkyl, acyl, trialkylsilyl, arylalkyldialkylsilyl, trialkoxysilyl, dialkoxyalkylsilyl or alkoxydialkylsilyl; $R^2$ is aryl, alkenyl or alkyl; $R^3$ is a $C_2$–$C_{12}$ linear, branched or cyclic alkylene; and X is an aliphatic, cycloaliphatic or aromatic hydrocarbon group.

5. A powder coating formulation as in claim 1 wherein $R^1$ is a linear, branched or cyclic $C_1$–$C_6$ alkyl group or an acetyl group; $R^2$ is an alkyl group of 1–4 carbon atoms; $R^3$ is $C_2$–$C_4$ alkylene; and X is a $C_4$–$C_{24}$ hydrocarbon group.

6. A powder coating formulation as in claim 1 wherein $R^1$ is methyl or ethyl; and X is a saturated linear, branched or cyclic aliphatic hydrocarbon group.

7. A powder coating formulation as in claim 1 wherein m is 2–6.

8. A powder coating formulation as in claim 1 wherein $R^1$ is $C_1$–$C_6$ alkyl or acetyl.

9. A powder coating formulation as in claim 1 wherein $R^3$ is $C_2$–$C_6$ alkylene.

10. A powder coating formulation as in claim 1 wherein the silane has the formula:

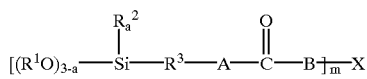

II wherein A and B are both NH or both O.

11. A powder coating formulation as in claim 1, further comprising a resin system selected from the group consisting of polyurethane systems based on blocked polyisocyanates and polyols; acid functional polymers cured with epoxy functional curing agents; anhydride/epoxy systems; epoxy/polyol systems; hybrid systems employing epoxide resins and polyesters; and systems based on hydroxyalkylamides and acid functional polymers.

12. A powder coating formulation as in claim 11 comprising an epoxy resin selected from the group consisting of bisphenol A-type polyepoxides, glycidyl methacrylate copolymers and epoxy-novolac resins.

13. A powder coating formulation as in claim 12 wherein the epoxy resin is a glycidyl methacrylate copolymer and wherein the composition further comprises a compound having thereon at least two carboxylic acid groups per molecule.

14. A powder coating as in claim 13 wherein the compound having two or more carboxylic acid groups per molecule is dodecanedioic acid.

15. A powder coating formulation as in claim 1 further including a resin system comprising a carboxyl functionalized polyester, polyacrylate or hybrid thereof, and triglycidylisocyanurate.

16. A curable powder coating formulation as in claim 1 further including a resin system comprising a carboxyl functionalized polyester, polyacrylate or hybrid thereof, and a hydroxyalkylamide.

17. A powder coating formulation as in claim 1 comprising a polyisocyanate, which is blocked with e-caprolactam or internally blocked with one or more uretdione groups, and a hydroxy functional polyester or hydroxy functional acrylic resin.

18. A powder coating formulation as in claim 1, further comprising at least one of an accelerating catalyst, a pigment, a leveling agent, a flow modifier, a light stabilizer, an antioxident or a filler.

19. A curable powder adhesive formulation which includes as a component thereof a silane of formula I:

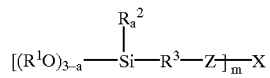

I where $R^1$ is a hydrocarbon, acyl, alkylsilyl or alkoxysilyl group; $R^2$ is a monovalent hydrocarbon group; $R^3$ is alkylene; a is 0 or 1; Z is a direct bond or a divalent organic linking group having from 2 to 5 carbon atoms; X is an m-valent organic group or H with the proviso that if Z is a carbamate then X is a 1° or 2° organic group; and m is 1 to 20; and a resin system selected from the group consisting of polyurethane systems based on blocked polyisocyanates and polyols, acid functional polymers cured with epoxy functional curing agents, anhydride/epoxy systems, hybrid systems employing epoxide resins and polyesters; and systems based on hydroxyalkylamides and acid functional polymers.

20. A powder adhesive as in claim 19 having a size distribution such that at least 50% by weight of said adhesive will pass through a 200 mesh screen.

21. A method of bonding two substrates, the method comprising applying a composition as in claim 19 to at least one of the substrates, joining the two substrates with heating to fuse the adhesive therebetween, and allowing the substrates to cool.

22. A method as in claim 21 wherein the adhesive is applied by electrostatic spraying, triboelectric spraying, electromagnetic brushing or via passing through a fluidized bed.

23. A curable powder coating formulation which includes a silane of formula I:

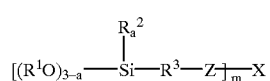

I wherein $R^1$ is a hydrocarbon, acyl, alkylsilyl or alkoxysilyl group; $R^2$ is a monovalent hydrocarbon group; $R^3$ is alkylene or alkylene with one or more ether oxygen atoms; a is 0 or 1; Z is a direct bond or a divalent organic linking group; X is a polyacrylate, polycarbonate, polyurethane, polyalkylene, polyester, polyamide, polyether or hydrogen; and m is 1 to 20.

24. A curable powder coating formulation which includes a silane of formula I:

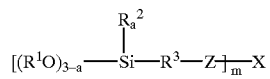

I wherein $R^1$ is a hydrocarbon, acyl, alkylsilyl or alkoxysilyl group; $R^2$ is a monovalent hydrocarbon group; $R^3$ is alkylene or alkylene with one or more ether oxygen atoms; a is 0 or 1; Z is a direct bond or a divalent organic linking group; X is a copolymer of glycidyl acrylate or glycidyl methacrylate; and m is 1 to 20.

25. A curable powder coating formulation which contains a silane of formula II:

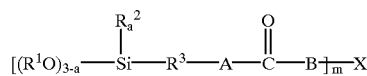

wherein $R^1$ is a hydrocarbon, acyl, alkylsilyl or alkoxysilyl group; $R^2$ is a monovalent hydrocarbon group; $R^3$ is alkylene or alkylene interrupted with one or more ether oxygen atoms; a is 0 or 1; X is an m-valent organic group or H; m is 1 to 20; A and B are NH; and the silane is an adduct of an isocyanatoalkylalkoxysilane and a polyamine.

26. A curable powder coating formulation which includes a silane of formula II:

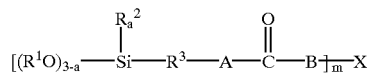

wherein $R^1$ is a hydrocarbon, acyl, alkylsilyl or alkoxysilyl group; $R^2$ is a monovalent hydrocarbon group; $R^3$ is alkylene or alkylene interrupted with one or more ether oxygen atoms; a is 0 or 1; X is an m-valent organic group or H; m is 1 to 20; A is NH or O; B is NH; and the silane is an adduct of a polyisocyanate and an alkoxysilylalkanol or alkoxysilylalkylamine.

27. A powder coating formulation which includes a silane of formula II:

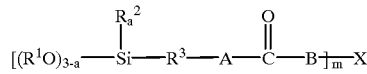

wherein $R^1$ is a hydrocarbon, acyl, alkylsilyl or alkoxysilyl group; $R^2$ is a monovalent hydrocarbon group; $R^3$ is alkylene or alkylene interrupted with one or more ether oxygen atoms; a is 0 or 1; X is a polyester or polyacrylate; m is 1 to 20; and A and B are independently NH or O.

28. A silane compound of formula II:

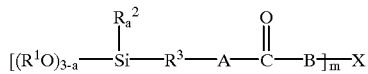

wherein $R^1$ is a hydrocarbon, acyl, alkylsilyl or alkoxysilyl group; $R^2$ is a monovalent hydrocarbon group; $R^3$ is alkylene or alkylene with one or more ether oxygen atoms; a is 0 or 1; X is an m-valent organic group or H; m is 1 to 20; A and B are NH; and said silane is an adduct of an isocyanatoalkylalkoxysilane and a polyamine.

29. A silane compound of formula II:

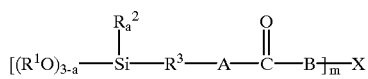

wherein $R^1$ is a hydrocarbon, acyl, alkylsilyl or alkoxysilyl group; $R^2$ is a monovalent hydrocarbon group; $R^3$ is alkylene or alkylene with one or more ether oxygen atoms; a is 0 or 1; X is an m-valent organic group or H; m is 1 to 20; A and B are NH; and said silane is an adduct of a polyisocyanate and an alkoxysilylalkylamine.

* * * * *